Aug. 14, 1923.

J. E. WANDER

DEMOUNTABLE RIM

Filed Dec. 6, 1921

1,465,196

Inventor:
Joseph Edward Wander,
By
Attorney

Patented Aug. 14, 1923.

1,465,196

UNITED STATES PATENT OFFICE.

JOSEPH EDWARD WANDER, OF WASHINGTON, DISTRICT OF COLUMBIA.

DEMOUNTABLE RIM.

Application filed December 6, 1921. Serial No. 520,316.

*To all whom it may concern:*

Be it known that I, JOSEPH EDWARD WANDER, a citizen of the United States, residing at Washington, District of Columbia, have invented new and useful Improvements in Demountable Rims, of which the following is a specification.

This invention relates to demountable tire carrying rims for automobile and other vehicle wheels, and particularly to improvements in the construction of tire carrying rims composed of separable sections adapted to facilitate the application and removal of the tire.

As a general thing, the demountable rims in common use are of the transplit type, and require the aid of a tool to contract and expand them to admit of the application or removal of the tire and the restoration of the rim to normal condition after the tire is applied. It frequently happens, however, that the automobilist is not in possession of the required tool at the time when he needs it, in which event it is practically impossible for him to make a tire change, and it is sometimes difficult even under best conditions to force the tire on the rim without the aid of other and special tools for that purpose.

One object of my invention is to provide a demountable rim, composed of separable sections, which overcomes the above-mentioned objections to split rims of ordinary type, and which admits of the ready application and removal of a tire without the use of special tools.

A further object of my invention is to provide a demountable rim which may be employed for use also as a spare rim for carrying a spare tire, and which when the use of a spare tire is needed can be immediately applied to the vehicle wheel.

The invention consists of the features of construction, combination and arrangement of parts, hereinafter fully described and claimed, reference being had to the accompanying drawing, in which:—

Figure 1:
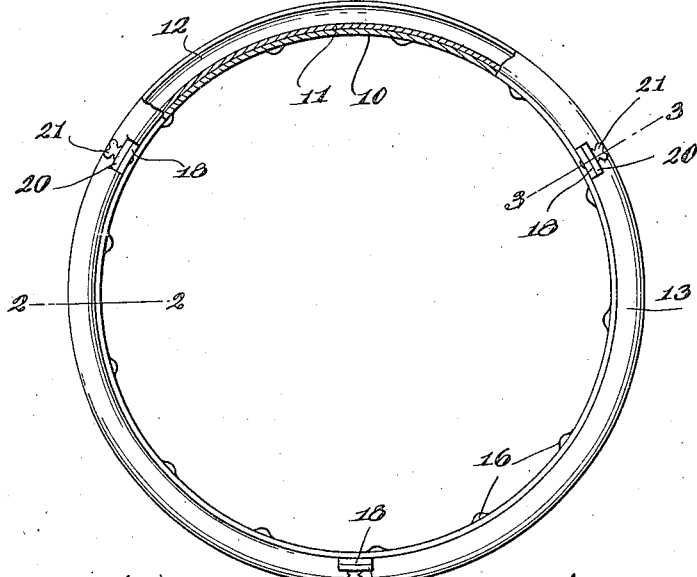
Figure 1 is a side elevation, partly in section, of a demountable rim embodying my invention, such view looking toward the inner side of the rim.

Referring to the drawing, 1 designates the felly of a vehicle wheel, which may be made of wood or metal and which is provided at intervals with transverse openings for the passage of fastening bolts 2. Arranged at the inner side of the felly 1 is a fixed annular abutment plate 3 having an outstanding flange 4 properly curved in cross section to form a seat for the tire confining flange on one member of the demountable rim, hereinafter described. The flange 4 is offset at its point of juncture with the plate 3 so as to provide an annular seat flange 5 and an abutment shoulder 6. The headed ends of the bolts extend through the plate 3 and bear thereon, and the shanks of the bolts project through the felly 1 and have threaded ends 7 projecting beyond the opposite side of said felly. The threaded ends of the bolts are designed to receive the usual removable wedge lugs 8, which hold the demountable rim in position on the felly, each wedge lug being removably fastened in position by a nut 9 applied to the threaded end of the bolt.

The demountable rim, constructed in accordance with my invention, is composed of two rim members 10 and 11 carrying the tire retaining flanges 12 and 13. These tire retaining flanges 12 and 13 are disposed at the opposite sides of the demountable rim to receive and engage the beads 14 at the opposite sides of the shoe of the pneumatic tire 15, whereby the tire is held in the demountable rim. Each rim member 10 and 11 consists of a continuous ring or annulus, the rim members being coextensive in width with each other and of a width somewhat greater than the width of the felly 1.

The rim member 10 is arranged to underlie the rim member 11 and is disposed between the same and the outer face of the felly 1, and the inner face of said rim member 10 is provided, on opposite sides of its longitudinal center, with annular series of spaced lugs or projections 16 to rest upon the felly 1 and properly space said rim member 10 from the felly. These spacing members 16 form an adequate bearing for the demountable rim and tire on the felly and reduce the amount of surface of the rim section 10 contacting with the felly so as to eliminate all liability of said rim member 10 binding on the felly and causing trouble or difficulty in applying or removing it. The rim members 10 and 11 as thus constructed and arranged are disposed in overlapping relationship, the flange 12 of the rim member 11 being located at the outer side of the wheel and engaging the outer bead 14 of the tire, while the flange 13 of the rim member 10 bears against the fixed retaining flange 4 and seats thereon at the inner side of the felly and receives and engages the inner bead 14 of the tire 15. As thus constructed, each rim member has a flanged edge, and an unflanged edge, and the unflanged edge of the rim member 10 is arranged beneath the flange 12 of the rim member 11, said unflanged edge of the rim member 10 and the flange 12 of the rim member 11 being engaged by the wedge lugs 8, which force the demountable rim against the fixed flange 4 and hold said rim seated on the felly and the rim sections in assembled relation and from separating movement. The unflanged edge of the rim member 11 terminates at the base of the flange 13 of the rim member 10 and engages a bearing shoulder 17 formed on said flange 13, whereby the rim members when connected are properly reinforced and their relative inward movements limited. For the purpose of further insuring a positive fastening of the rim members 10 and 11 together when on the wheel, and their connection against disengagement when off the wheel, so as to adapt them to serve as a spare tire carrier, I provide the unflanged edge of the outer rim member 11 at intervals with tongues 18 which project outwardly through slots 19 in the base of the flange 13 of the inner rim member 10, which flange 13 is provided with lugs 20 to cooperate with said tongues, said tongues and lugs being detachably secured together in any suitable manner, as by means of thumb screws 21 engaging threaded openings 22 therein. Each tongue 18 and its cooperating lug 20 form a fastening connection which projects outwardly through a slot 23 formed in the fixed flange 4, whereby provision is made for their reception, said fastening connections furthermore serving as stops bearing against the walls of the slots 23 to prevent the rim and tire from creeping or having circumferential motion on the felly 1.

Figure 2:
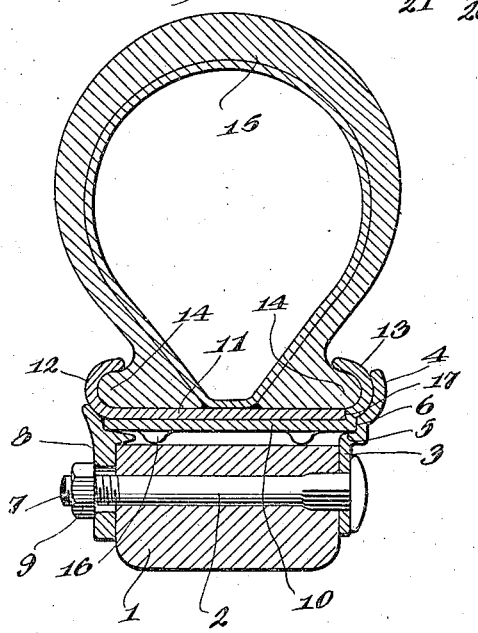
Figure 2 is a cross section through the rim on the line 2—2 of Figure 1.
Figure 3:
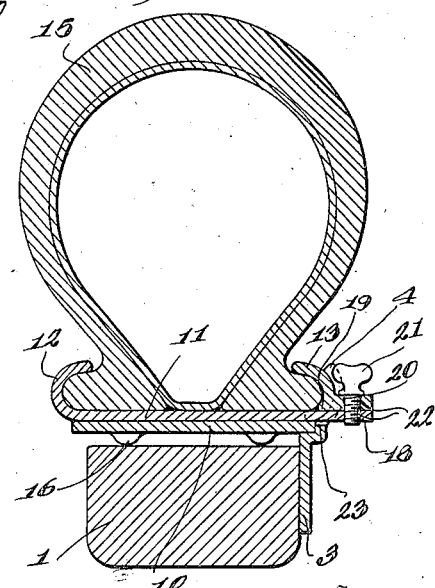
Figure 3 is a cross section through the rim on the line 3—3 of Figure 1.

Figures 2 and 3 of the drawing show the demountable rim applied with a tire seated therein, from which it will be seen that the demountable rim will be applied and held upon the felly in the usual manner, being held between the fixed flange 4 at one side of the felly and the wedge lugs 8 at the opposite side of the felly. When it is desired to remove the tire, the wedge lugs 8 at the outer side of the felly are detached from the bolts, leaving the demountable rim free to be slid laterally at that side off the felly, after which, by removing the thumb screws 21, the two sections of the demountable rim will be released for disengagement allowing them to be laterally separated, thus releasing the tire 15 and permitting it to be removed. In applying a tire, the tire is first seated upon the base of the rim member 11 with one of its beads 14 engaged with the flange 12 of said rim member, and then said rim member is slid into operative position over upon the rim member 10 so that the other bead of the tire will be engaged with the flange 13 of said rim member 10, such operation causing the projection of the tongues 18 through the slots 19 in the flange 13, after which the screws 21 may be applied to fasten said rim sections together. The tire may be inflated and carried upon the rim in such condition to be used as a spare tire and rim, or the rim and tire applied as described may be fitted upon the wheel in an obvious manner and the wedge lugs 8 applied to clamp the demountable rim in position, as will be readily understood. It will of course be obvious that the tire 15 may be inflated before or after its application to the demountable rim and before its application to the wheel, or may be inflated after the demountable rim and tire are applied to the wheel.

It will, of course, be understood that suitable provision will, in practice, be made in the rim members for the reception and passage of the valve stem of the tire.

One advantage of my improved demountable rim is that it may be applied to wheels designed to carry any ordinary demountable rim without change in the structure of the wheel felly or fixed rim, if it be provided with such. Another advantage is that in applying a tire to or removing it from the demountable rim no tools whatever are required, as the thumb screws 21 may be applied and removed without the use of tools. Also in applying the demountable rim to or removing it from the felly no tools are required other than the use of an ordinary wrench such as is customarily employed in applying or removing the nuts 9. My invention therefore does away with the necessity of employing tools for applying or removing the demountable rim, or for forcing a bead of the tire over the bead confining flange of the demountable rim, as is generally required in the use of demountable rims of the types commonly employed, and accordingly my rim may be more easily and conveniently applied to and removed from the wheel and the tire applied to and removed from the demountable rim, enabling a motorist to make tire changes in a simple manner and with the expenditure of the least amount of time and labor.

Having thus fully described my invention, I claim:—

A demountable rim comprising a pair of laterally separable sections arranged in lapping engagement, said sections having reversely disposed flanged edges and plain edges, the flange of one section having slots therein and lugs thereon, and the plain edge of the other section having tongues projecting through said slots, and removable fastening members for engaging the tongues of one demountable rim section with the lugs of the other demountable rim section for holding said rim sections detachably connected.

In testimony whereof I affix my signature.

JOSEPH EDWARD WANDER.